Figure 1:
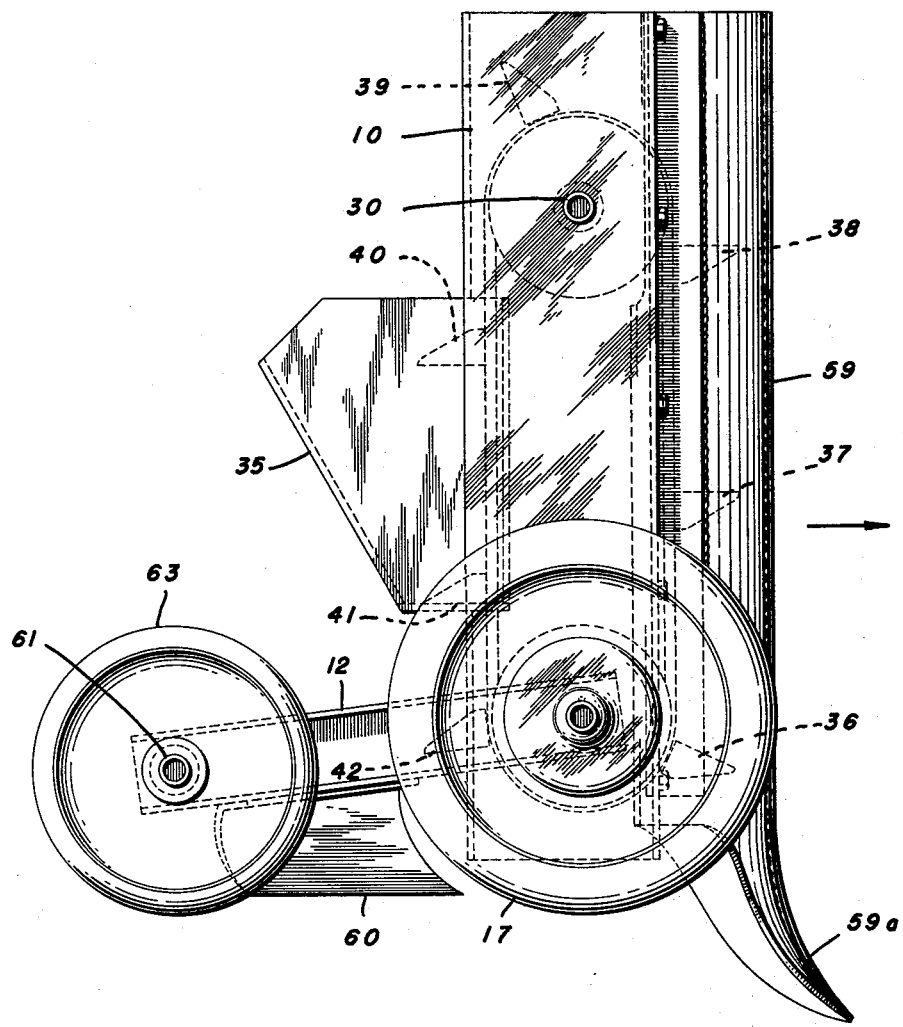

March 26, 1963 J. J. SABAITIS 3,082,919
HOPPER-FED DISTRIBUTING MECHANISM
Filed Dec. 18, 1961 4 Sheets-Sheet 1

JOHN J. SABAITIS
INVENTOR.

BY

March 26, 1963

J. J. SABAITIS 3,082,919

HOPPER-FED DISTRIBUTING MECHANISM

Filed Dec. 18, 1961

4 Sheets-Sheet 2

JOHN J. SABAITIS
INVENTOR.

BY

March 26, 1963 J. J. SABAITIS 3,082,919
HOPPER-FED DISTRIBUTING MECHANISM
Filed Dec. 18, 1961 4 Sheets-Sheet 3
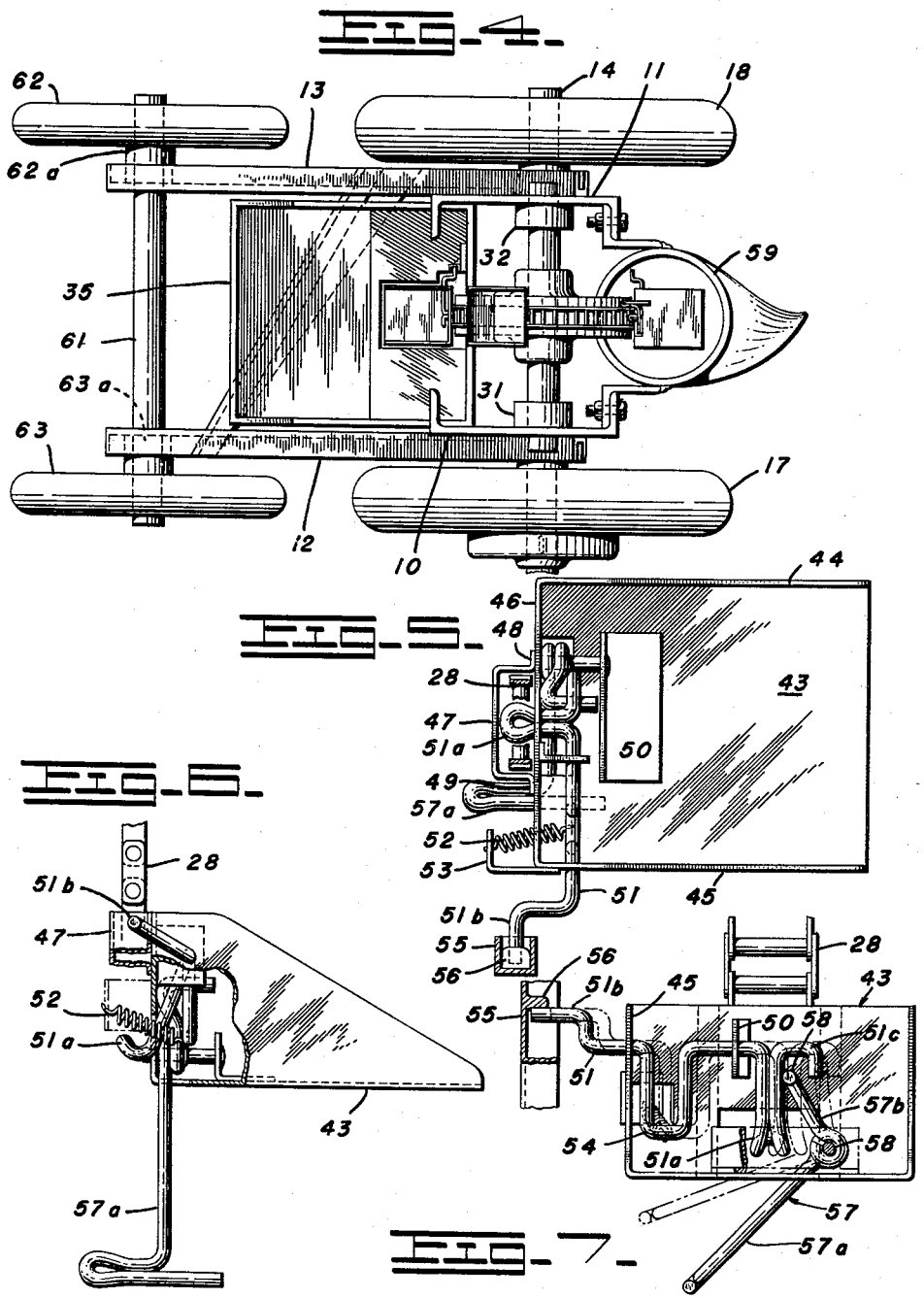
INVENTOR:
JOHN J. SABAITIS
BY March 26, 1963
J. J. SABAITIS
3,082,919
HOPPER-FED DISTRIBUTING MECHANISM
Filed Dec. 18, 1961
4 Sheets-Sheet 4
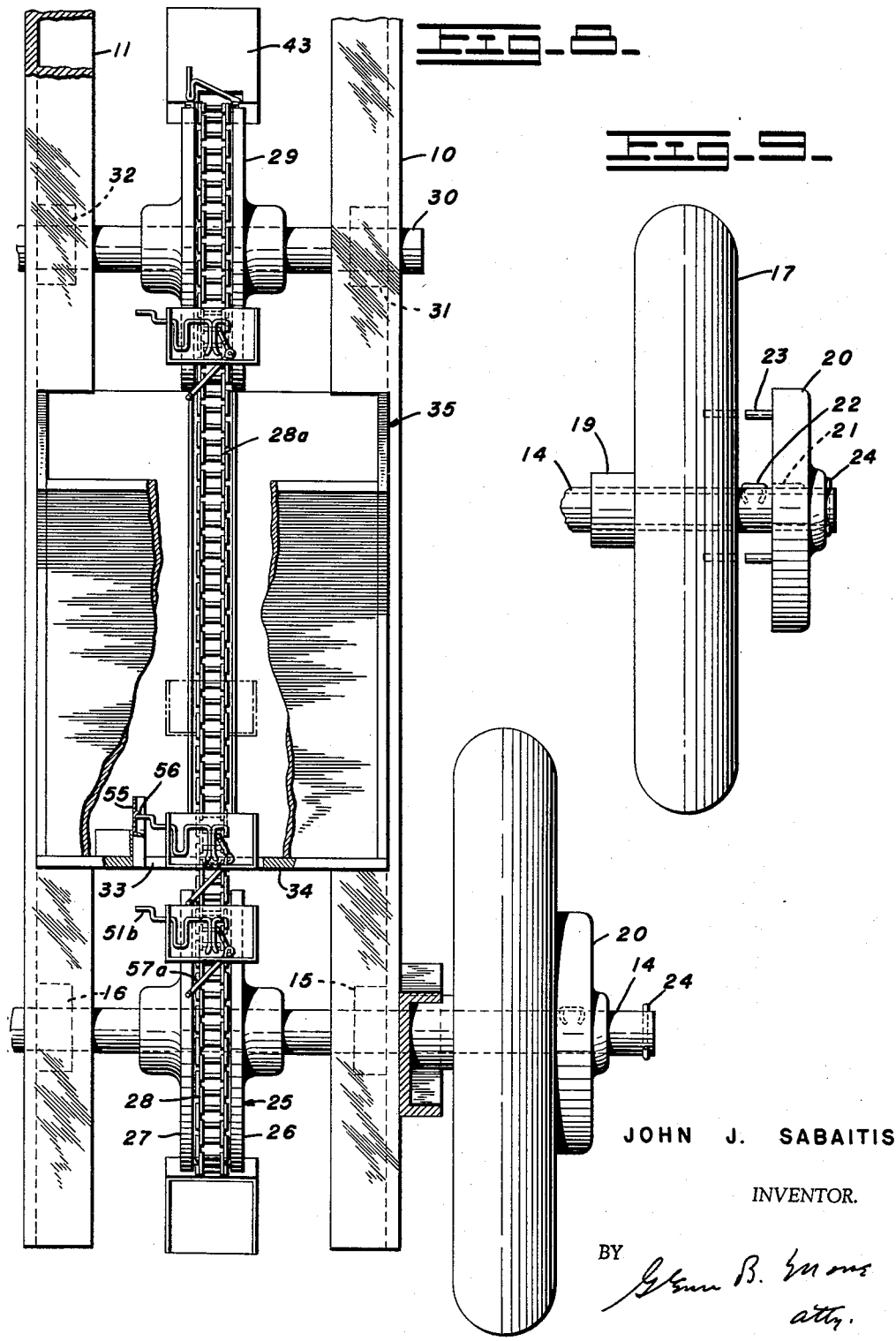
JOHN J. SABAITIS
INVENTOR.
BY

United States Patent Office 3,082,919
Patented Mar. 26, 1963

3,082,919
HOPPER-FED DISTRIBUTING MECHANISM
John J. Sabaitis, Trenton Ave., Rte. 2, Cedar Springs, Mich.
Filed Dec. 18, 1961, Ser. No. 160,102
6 Claims. (Cl. 222—371)

This invention provides a mechanism for withdrawing discrete pieces of bulk material from a hopper and distributing the same. The preferred form of the invention has been developed as a component of a planting machine, and has been operated successfully in planting potatoes. It is the usual agricultural practice to cut potatoes into pieces of one or two cubic inches in size (each of these pieces containing at least one "eye"), and to deposit these in spaced relationship either in a planting row or in a series of holes of proper depth.

To minimize the amount of attention required to operate a planting machine handling this type of material, it is highly desirable that the supply be contained in random fashion in a hopper. This arrangement makes it possible to throw in a collection of pieces without orienting them in a particular fashion, or associating them manually with a particular gripping device. Many hopper-fed devices utilize the principle of an endless chain carrying a series of platforms or buckets dipping into the hopper, and this form of operation is quite satisfactory in the case of finely-divided material which has a tendency to flow in the manner of liquid. When larger pieces are involved, however, a resistance to displacement is encountered which makes the "dipping" action impractical.

Applicant has found that it is possible to utilize the endless chain type of conveyor device as a means of withdrawing larger particles from the hopper by passing one section of the chain (moving in normally upward direction) through an opening in the bottom of the hopper. When a platform or bucket of substantial size is used, however, the size of the required opening in the hopper is such as to permit the material to fall through after the bucket has passed upwardly beyond the hopper opening. To prevent this, applicant has devised a mechanism for using a series of platforms or buckets which are movable axially with respect to the carrying chain, and a mechanism for maintaining one bucket in position within the opening in the hopper. As a succeeding bucket approaches from underneath, a release mechanism permits the previously restrained bucket to continue its upward movement through the hopper, and acquire its load which usually constitutes a single piece of potato. The size of the bucket is established to select the number of pieces which may be desired. As the bucket continues on with its vertical movement above the hopper, it moves over an idler pulley and dumps its contents preferably into a chute which conducts the pieces downward into the point where they are deposited in sequence in the planting row. The planter is preferably provided with a device for opening the furrow, and for closing it behind the planting point.

The several features of the invention will be analyzed in further detail through a discussion of the particular embodiments illustrated in the accompanying drawings. In the drawings:

FIGURE 1 presents a side elevation of a planting machine embodying this invention.

Figures 2, 3:
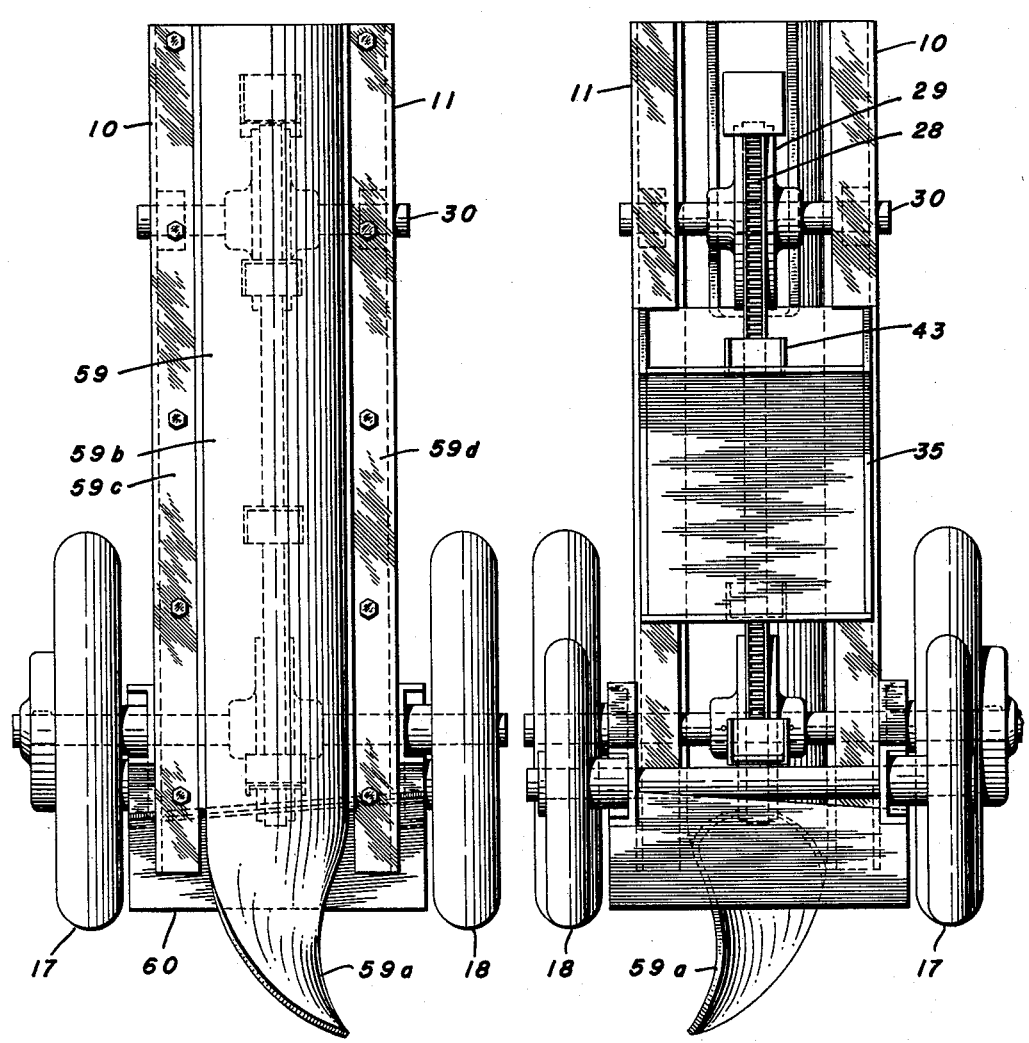

FIGURE 2 presents a front elevation of the device shown in FIGURE 1.

FIGURE 3 presents a rear view of the device shown in FIGURE 1.

FIGURE 4 presents a top view of the device shown in FIGURE 1.

FIGURE 5 presents a plan view on an enlarged scale of the carrying platform assembly.

FIGURE 6 presents a side elevation of the platform assembly shown in FIGURE 5.

FIGURE 7 presents a front elevation of the carrying platform of FIGURE 5.

FIGURE 8 presents a fragmentary sectional view in front elevation showing the behavior of the carrying platforms on the chain as they move through the hopper.

FIGURE 9 presents a view of the clutch mechanism shown in FIGURE 8, in the disengaged condition.

The machine shown in FIGURE 1 includes a frame formed by the opposite channels 10 and 11 and the beams 12 and 13. A shaft 14 is rotatably mounted in the bearings 15 and 16 secured respectively to the channels 10 and 11, and the wheels 17 and 18 are rotatably carried on the shaft 14. A clutch mechanism best shown in FIGURE 9 transfers driving torque to the shaft 14. The wheel 17 is axially slidable on the shaft 14, its position being stabilized by the hub 19. The wheel 18 is similarly constructed. A coupling plate 20 is also axially slidable on the shaft 14, and is provided with a keyway 21 for engaging the key 22 which is fixed with respect to the shaft 19. For economy, the shaft 14 may be a piece of steel pipe, and the key 22 may be in the form of a heavy piece of wire bent into a U-shaped configuration similar to a conventional staple. The legs may be inserted through suitable holes, with the ends clinched as shown to prevent inadvertent withdrawal. The clutch member 20 is also provided with axially-extending dowels 23 which register with similarly-located holes in the wheel 17. Sliding the coupling member 20 to the left will at the same time engage the keyway 21 and the key 22, and also the dowels 23 with the opposite holes in the wheel 17. Such engagement will result in the transfer of torque from the wheel to the shaft 14, and movement of the planting machine shown in FIGURE 1 across the ground in the direction of the arrow will induce a rotation of the shaft 14 in a clockwise direction as viewed in FIGURE 1. A cotter key as shown at 24 may be used to limit the movement of the coupling member 20 to the right, and any conventional retention may be used at the opposite end to secure the wheel 18 against removal from the shaft 14. Normally all of the drive is provided by the wheel 17, with the wheel 18 rotating freely with respect to the shaft 14.

A wheel 25 is fixed with respect to the shaft 14, and is provided with the rim flanges 26 and 27 to retain the chain 28 against axial displacement. An upper wheel 29 is of similar construction, and is rotatably mounted with respect to the frame on the shaft 30. Preferably, the wheel 29 is fixed with respect to the shaft 30, with the shaft being supported on the bearing blocks 31 and 32. The mounting of the wheels 25 and 29 results in establishing a path of movement of the chain 28 in a substantially vertical plane, with one course of the chain (indicated at 28a) moving vertically upward through the opening 33 in the bottom 34 of the hopper 35.

A series of carrying platforms 36–42 are slidably mounted on the chain 28, and the structural details of these assemblies are best shown in FIGURES 5, 6, and 7. Each of these includes a platform member 43 having the opposite sides 44 and 45 connected by the back 46. This results in a scoop-shaped member, with the chain 28 being held in engagement with the back by the hat-shaped retainer 47 preferably welded to the back 46 at the outwardly-turned flanges 48 and 49.

The angle bracket 50 secured to the back 46 of the platform, and the side 45, contain apertures providing bearings, for the dog 51. The portion 51a of the dog 51 moves to and from a position between the links of the chain 28 by rotation, and is biased into the position shown in FIGURE 5 (engaging the chain) by the spring 52. This spring extends between an anchor 53 secured to the platform member 43 and the offset portion 54 of the dog 51. The offset acts as a bell-crank for converting the tension of the spring 52 into torque.

Prior to the entrance of the platform assemblies 43 in the opening 33 in the bottom of the hopper, the end 51b of the dog 51 is received within a channel 55 which is fixed with respect to the hopper 35. A stop 56 is provided in the channel 55 at the point exactly corresponding to the position of the platform member within the opening 33. This condition is illustrated in FIGURE 8. The force provided by the stop (refer particularly to FIGURE 5) induces a rotation of the dog 51 such that the portion 51a is swung out of engagement with the chain 28, thus permitting the platform assembly to remain in place while the chain continues its vertical movement upwardly through the hopper. This condition continues until a succeeding platform assembly approaches to the point of contacting the lower end 57a of the release member 57 which is pivotally mounted on the pin 58 secured to the back 46 of the platform member. The member 57 is provided with an upper portion 57b having the end 58 received within the U-shaped end 51c of the dog 51. The application of forces by the succeeding platform assembly (this condition beginning in FIGURE 8) results in moving the release lever 57 to the dotted line position shown in FIGURE 7, resulting in lateral sliding movement of the dog 51 into the dotted line position. The fixed position of the end of the spring 52 engaging the member 53 establishes a tendency to return the dog 51 to the full line position after the lateral sliding movement has released the end 51b from the stop 56. This release then permits the spring 52 to reengage the portion 51a with the chain thereby to transfer the carrying force of the chain, and to cause the upward movement of that particular platform assembly through the hopper where it can collect its load and carry it upwardly. With a relatively slight modification of the proportions of the illustrated components, it is possible to use the stop 56 entirely to establish resistance to movement of the platform assemblies, with the chain having a limited ability to apply forces. This arrangement results in disengagement of the chain from the platforms by slippage.

The loaded platform proceeds upwardly and over the wheel 29, normally dumping its contents into the chute 59. The pieces carried by the platforms will ordinarily drop down onto the back of the preceding platform assembly, and are then dropped into the planting furrow opened by the plow portion 59a of the chute 59. The formation of the chute 59 may be as shown in FIGURE 4, consisting of a central pipe 59b secured to the opposite angles 59c and 59d which are bolted to the flanges of the channels 10 and 11 as shown.

The beams 12 and 13 provide support for a furrow-closing blade 60, and also carry the shaft 61 supporting the rear wheels 62 and 63. The shaft 61 may be fixed with respect to the beams 12 and 13, or the hubs 62a and 63a may be secured to a rotatable shaft 61. In either event, the wheels 62 and 63 are freely rotatable with respect to the remainder of the device. The entire unit may be moved forward by hand by the application of suitable handles (not shown), or a group of the devices illustrated in FIGURE 1 may be collected in a gang and secured to a transverse beam of conventional design carried by a tractor.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A delivery mechanism for bulk material, said mechanism comprising: hopper means having an opening in the bottom thereof; endless chain means including drive means and sprocket means positioning said chain means in a substantially vertical plane, said chain means having a portion engaging said opening and traversing said hopper in a normally substantially upward direction; a plurality of platform means slidably engaging said chain means and each including a laterally movable and rotatable dog engageable with said chain means on rotation of said dog for the transfer of carrying forces; biasing means urging said dogs into engagement with said chain means; stop means on said hopper engageable with said dog to disengage said dog from said chain; lever means on said platform means, said lever means having a portion disposed to contact a succeeding platform means, and also a portion disposed to move said dog laterally to disengage said dog in response to forces provided by said succeeding platform means; and chute means traversed by said platform means in a normally downward direction.

2. A delivery mechanism for bulk material, said mechanism comprising: hopper means having an opening in the bottom thereof; endless chain means including drive means and sprocket means positioning said chain means in a substantially vertical plane, said chain means having a portion engaging said opening and traversing said hopper in a normally substantially upward direction; a plurality of platform means slidably engaging said chain means and each including a laterally movable and rotatable dog engageable with said chain means on rotation of said dog for the transfer of carrying forces; biasing means urging said dogs into engagement with said chain means; stop means on said hopper engageable with said dog to disengage said dog from said chain; and lever means on said platform means, said lever means having a portion disposed to contact a succeeding platform means, and also a portion disposed to move said dog laterally to disengage said dog in response to forces provided by said succeeding platform means.

3. A delivery mechanism for bulk material, said mechanism comprising: hopper means having an opening in the bottom thereof; endless chain means including drive means and sprocket means positioning said chain means in a substantially vertical plane, said chain means having a portion engaging said opening and traversing said hopper in a normally substantially upward direction; a plurality of platform means slidably engaging said chain means and each including a dog engageable with said chain means for the transfer of carrying forces; biasing means urging said dogs into engagement with said chain means; stop means on said hopper engageable with said dog to disengage said dog from said chain; and lever means on said platform means, said lever means having a portion disposed to contact a succeeding platform means, and also a portion disposed to disengage said dog in response to forces provided by said succeeding platform means.

4. A delivery mechanism for bulk material, said mechanism comprising: hopper means having an opening in the bottom thereof; endless chain means including drive means and sprocket means positioning said chain means in a substantially vertical plane, said chain means having a portion engaging said opening and traversing said hopper in a normally substantially upward direction; a plurality of platform means slidably engaging said chain means; disengageable coupling means connecting said platform means to said chain means for transfer of forces along said chain means; stop means on said hopper for halting the movement of said platform means and disengaging said coupling means; release means operative to disengage said platform means and said stop means in response to forces applied by a succeeding platform means; and chute means traversed by said platform means in a normally downward direction.

5. A delivery mechanism for bulk material, said mechanism comprising: hopper means having an opening in the bottom thereof; endless chain means including drive means and sprocket means positioning said chain means in a substantially vertical plane, said chain means having a portion engaging said opening and traversing said hopper in a normally substantially upward direction; a plurality of platform means slidably engaging said chain means; disengageable coupling means connecting said platform means to said chain means for transfer of forces along said chain means; stop means on said hopper for halting the movement of said platform means in said opening and disengaging said coupling means; and release means operative to disengage said platform means and said stop means in response to forces applied by a succeeding platform means.

6. A delivery mechanism for bulk material, said mechanism comprising: hopper means having an opening in the bottom thereof; endless chain means including drive means and sprocket means positioning said chain means, said chain means having a portion engaging said opening and traversing said hopper in a normally substantially upward direction; a plurality of platform means slidably engaging said chain means; disengageable coupling means connecting said platform means to said chain means for transfer of forces along said chain means; stop means on said hopper for halting the movement of said platform means and disengaging said coupling means; and release means operative to disengage said platform means and said stop means in response to forces applied by a succeeding platform means.

References Cited in the file of this patent

UNITED STATES PATENTS

| 426,689 | Silvertooth | Apr. 29, 1890 |
| 579,683 | Romine | Mar. 30, 1897 |
| 1,354,202 | Lafleche | Sept. 28, 1920 |

FOREIGN PATENTS

| 283,680 | Germany | Apr. 21, 1915 |